Patented Jan. 26, 1954

2,667,406

UNITED STATES PATENT OFFICE 2,667,406

PROCESS FOR PRODUCING INSOLUBLE SULFUR

Ralph Eugene Morningstar, Columbus, Ohio, assignor to Mathieson Chemical Corporation, a corporation of Virginia No Drawing. Application December 19, 1950, Serial No. 201,692

3 Claims. (Cl. 23—224)

My invention relates to improvements in the production of that form of sulfur commonly known as insoluble sulfur, which is substantially insoluble in carbon bisulfide, and more particularly to the production of insoluble sulfur which is substantially stable with respect to reversion to soluble sulfur.

Several methods of producing insoluble sulfur have been proposed in the past. These methods include quenching molten sulfur or sulfur vapor in various liquids, for example, water, aqueous acids and alkalies, carbon bisulfide, hydrocarbons, etc., to convert a portion of the treated sulfur to the insoluble form. In general, the conventional methods produce products which are inherently unstable and require the addition of stabilizers to inhibit the reversion from the insoluble to the soluble form of sulfur.

I have been able to produce an insoluble sulfur in good yield and with such stability with respect to reversion that the addition of foreign stabilizers is unnecessary. I have found that by quenching superheated sulfur vapor with a stable, inert highly halogenated liquid hydrocarbon quenching medium, insoluble sulfur is produced in good yield and that when freed of quenching medium and properly aged, insoluble sulfur produced in this way possesses marked stability with respect to reversion.

In accordance with my process sulfur is melted, vaporized and the sulfur vapors are superheated and then immediately quenched to below about 60° C. with a liquid carbon tetrachloride quenching medium. The quenched sulfur is suitably aged and then ground to the desired degree of fineness. The product produced by my process contains from 50 to 60 per cent of an insoluble sulfur with such stability with respect to reversion that the addition of foreign stabilizing materials is unnecessary. The product is obtained as a bright yellow solid rather than as a dark colored material which is less merchantable.

I have found that the use of a liquid carbon tetrachloride quenching medium has particular value in imparting to the insoluble sulfur produced a stability against reversion to the soluble form. Carbon tetrachloride also is advantageous because it is inexpensive, readily available and is non-corrosive and non-inflammable. Similar highly halogenated hydrocarbons, for example, chlorinated lower aliphatics such as trichloroethylene, tetrachloroethylene, trichloroethane, pentachloroethane, chloroform and chlorinated benzenes such as dichlorobenzenes, trichlorobenzenes, tetrachlorobenzenes, and the like, also appear to be useful.

In addition to its advantage in producing an insoluble sulfur product with substantial stability with respect to reversion, the use of a liquid carbon tetrachloride quenching medium is advantageous because it is readily removed from the sulfur product by simple evaporation as compared to sulfuric acid which requires water washing and subsequent drying to remove the water wash liquor. According to my invention, quenching medium can be removed by simple exposure to air at ordinary temperature. More rapid removal can be accomplished by use of vacuum treatment with or without slightly elevated temperature conditions.

The vaporization of the sulfur and superheating of the sulfur vapors may be carried out in any convenient manner. For example, the sulfur is melted and boiled in a closed vessel. The resultant vapors are superheated by the addition of heat to the vapor conduit leading to the quenching operation. Superheating is also accomplished by restriction of the sulfur vapor exit, i. e., use of a jet discharge, so that the initial melting and vaporizing of the sulfur occur at super-atmospheric pressure.

When the quenched sulfur mass has been freed of quenching medium, the sulfur is aged for a sufficient period of time so that the sulfur stabilizes and hardens. Sufficient aging can be accomplished at room temperature in a period of approximately 24 hours. The required period can be shortened, i. e., the aging accelerated, by elevating the aging temperature. However, the aging temperature must be maintained below that at which reversion to the soluble form occurs. For example, aging at 78° C. for 1.3 hours causes the sulfur mass to stabilize and harden, while a temperature of 105° C. causes complete reversion to the soluble form. Accelerated aging may be accomplished at elevated temperatures up to approximately 80° C. without reversion.

After the quenched sulfur has been suitably aged and then ground to the desired degree of fineness, it is ready for immediate use in many applications. The product in this form contains 50 to 60 per cent of an insoluble sulfur which is substantially stable with respect to reversion. Where it is desirable or necessary for some particular application to have the insoluble sulfur in more concentrated form, the product after aging and grinding is subjected to an extraction step with a solvent for the soluble sulfur. The insoluble sulfur content of the final product can be raised readily to 90 per cent or more by this extraction without loss of stability with respect to reversion. In this more particular aspect of my invention, toluene is used with special advantage as the extraction agent since it appears to cooperate with the quenching medium in yielding a product of good stability against reversion. The stability of the extraction products with respect to reversion of the insoluble sulfur to soluble sulfur is illustrated in Examples 7 and 8 following. The stability of these products is satisfactory for commercial use, and no foreign stabilizers are required.

The concentrated insoluble sulfur produced by extraction is a free-flowing material. This is an important advantage, as the absence of any tendency to agglomerate facilitates the admixture of the concentrated insoluble sulfur with other finely ground solid materials.

The extraction includes subjecting the aged and ground sulfur to the action of a solvent for rhombic or soluble sulfur at an elevated temperature for a period of time sufficient to dissolve the desired portion of the soluble sulfur. The solvent is then removed from the remaining solid sulfur by filtration followed by evaporation in air or other suitable means.

It is important that the quenched sulfur be suitably aged prior to the extraction so that excessive reversion of the insoluble sulfur to the soluble form does not occur. If extraction of a quenched sulfur product which has had little or no aging is attempted, complete reversion to soluble sulfur may take place. For example, a sample of sulfur product prepared by quenching superheated sulfur vapor in carbon tetrachloride was filtered from the quenching medium and immediately extracted with toluene at 100° C. for one hour to remove the soluble sulfur. At the end of this time, however, all the sulfur had gone into solution indicating complete reversion to soluble sulfur.

Carbon bisulfide, benzene, ethylene dichloride, as well as other solvents for rhombic sulfur are suitable liquids for this extraction. As mentioned above, however, toluene appears to be particularly suited for this extraction. Carbon bisulfide ordinarily must be distilled from the solution of carbon bisulfide and soluble sulfur in order to reuse it and to recover the rhombic sulfur for recycling to the quenching operation. The higher boiling solvents have the advantage that they may be used at a more elevated temperature and cooled more conveniently to a temperature where most of the soluble sulfur will crystallize out and can be removed. When the higher boiling solvents are used in this manner, the sulfur is recovered and the solvent is recycled without intermediate distillation.

The temperature of the extraction should not exceed the temperature at which reversion of the insoluble sulfur occurs. In general, a temperature of 90° C. should not be exceeded in order to avoid excessive reversion. Extraction at 90° C. with a suitable solvent yields a sulfur product with a minimum content of 90 per cent insoluble sulfur. While the use of higher temperatures, e. g., 100° C., yields a product of increased insoluble sulfur content, the improvement in quality is obtained at a cost of a substantial decrease in yield. For example, while 100 parts of a sulfur product produced as described above and containing approximately 53 per cent of insoluble sulfur yields 47 parts of a product containing about 97.5 per cent insoluble sulfur after extraction with toluene at 80° C., 100 parts of the same sulfur product extracted with toluene at 100° C. yields 32 parts of a sulfur product with an insoluble sulfur content of about 98.6 per cent.

The following examples will illustrate the process of my invention.

*Example I*

Sulfur vapor was generated by heating sulfur in a closed container, and the vapors were conducted through a superheating line whereby the temperature of the vapors was elevated by controlled heating. In this batch-type operation, the superheated sulfur vapor was delivered to a quenching tank containing a body of liquid carbon tetrachloride as the quenching medium by a conduit extending into the body of liquid. The temperature of the superheated sulfur vapor entering the quenching medium was above the kindling point of sulfur. In order to prevent either condensation or freezing of sulfur in the conduit, the discharge end of the conduit was prevented from contacting the quenching medium by a blanket of nitrogen, but any inert gas would be suitable for this purpose. The gas was supplied to the vapor exit by means of an annular chamber positioned around the vapor conduit. The annular gas supply chamber was separated from the hot sulfur vapor conduit by an annular ring of insulation. The agitation caused by the bubbles of escaping gas aided in the circulation of quenching medium to prevent local overheating. Cooling coils were provided in the tank to insure the maintenance of the temperature of the quenching medium below about 60° C. In this manner the sulfur vapor was quenched from a superheat temperature to a temperature below about 60° C. in the quenching medium where it became a solid spongy mass. When all the sulfur vapor had been quenched, the sulfur mass was removed and freed of quenching medium. This was readily accomplished by decanting the quenching medium and exposing the sulfur mass to air drying at room temperature. After allowing the sulfur to age for one day at room temperature, it was hard and brittle and was readily ground to particle form. A sample of the ground product was subjected to extraction with carbon bisulfide and showed an insoluble sulfur content of about 53.5 per cent.

When, in the same type operation as described above carbon bisulfide was placed in place of the carbon tetrachloride, the insoluble sulfur formed represented only 37 per cent of the sulfur condensed. The product was unstable by commercial standards without added stabilizers.

*Example II*

Following the procedure of Example I, two runs were made to determine the effect of the quenching medium temperature on the insoluble sulfur content of the resultant product. In the first of these runs, the carbon tetrachloride was maintained at a temperature between 0° and 30° C. The resulting product, after aging one day at room temperature, showed an insoluble sulfur content of about 52 per cent. The temperature of the quenching medium in the second run was maintained between 30° and 60° C. The resulting product, after aging one day at room temperature, showed an insoluble sulfur content of about 50 per cent. Therefore, maintaining the quenching medium temperature at a point substantially lower than the maximum allowable temperature of 60° C. seems to have little or no effect on the insoluble sulfur content of the product.

*Example III*

Sulfur vapor was generated by melting and boiling sulfur in a closed container. The sulfur vapor was superheated by passage through a heated portion of the sulfur vapor conduit. The quenching step was conducted in a manner which can be adapted to continuous operation. The superheated sulfur vapor and carbon tetrachloride were introduced into a mixing jet. The mixing jet is formed by the exit portion of the sulfur vapor conduit and an annular quenching medium chamber to which quenching medium is continuously supplied. The annular quenching medium exit surrounds the vapor conduit exit and can be made adjustable to control the rate of flow of quenching medium. In this mode of quenching, the sulfur vapor emerging from the vapor exit at a superheat temperature is intimately mixed with the liquid quenching medium so that the quenching of the sulfur vapor from a superheat temperature to a temperature below about 60° C. is quickly effected. The stream emerging from the mixing jet was discharged into a stainless steel basket filter. In continuous operation the quenched sulfur could be continuously withdrawn or allowed to collect and removed periodically. The quenching medium was collected and returned to the quenching jet after a suitable cooling or refrigeration had been accomplished to maintain the temperature of quenching medium and sulfur emerging from the jet below about 60° C. During the run the inlet temperature of the carbon tetrachloride was about 32° C. and the outlet temperature about 50° C. The ratio of carbon tetrachloride to sulfur was approximately 100:1. The air dried product, after aging one day at room temperature, showed an insoluble sulfur content of 57 per cent when extracted with carbon bisulfide.

Example IV

A sample of a sulfur product prepared as described in Example I was freed of the quenching medium and placed in an oven maintained at a temperature of approximately 78° C. At the end of 1.3 hours the product had hardened sufficiently for grinding. Extraction of the ground product with carbon bisulfide indicated an insoluble sulfur content of 59.5 per cent.

Example V

A composite sulfur product prepared according to the preceding examples showed an insoluble sulfur content of about 52 per cent. Eighty-eight parts of the round product were heated with stirring at 80° C. with 390 parts by weight of toluene. At the end of 30 minutes the toluene was removed from the remaining solid sulfur by filtration and the product air dried. The extraction product showed an insoluble sulfur content of about 90 per cent on analysis with carbon bisulfide.

Example VI

A sulfur product was prepared as described in the preceding examples. After aging for one day at room temperature the material was reduced to particle form by grinding. Soxhlet extraction of a portion of the ground product for 20 minutes indicated that the product contained about 50 per cent of insoluble sulfur. The material was stirred with toluene at 80° C. for one hour and filtered. The remaining toluene was evaporated from the residual sulfur by air drying. The resulting material had an insoluble sulfur content of 92.9 per cent.

Example VII

To determine the effect of extraction temperature on stability with respect to reversion, a sulfur product containing approximately 50 per cent of insoluble sulfur prepared as described in Example I and properly aged was subjected to extraction with toluene at several temperatures. In each extraction approximately that amount of solvent which would dissolve the rhombic sulfur contained in the sample at the temperature of extraction was employed. The extraction was completed as described in the preceding two examples. The residual sulfur then contained the amount of insoluble sulfur shown in the following table:

| Age After Extraction (in days) | Percent of Insoluble Sulfur in Extraction Product For Extraction Temperature | | |
|---|---|---|---|
| | 50° C. | 90° C. | 100° C. |
| 1 | 92.0 | 97.4 | 94.6 |
| 7 | 91.1 | 97.6 | 94.3 |
| 23 | 88.8 | 95.6 | 93.3 |
| Rate of Reversion (percent per month) | 4.2 | 2.3 | 1.6 |

Example VIII

A sulfur product prepared as described above containing approximately 50 per cent of insoluble sulfur was extracted with ethylene dichloride at 82° C. for one hour, filtered, and the residual sulfur exposed to the air until the remainder of the solvent had evaporated. The resulting sulfur product contained 91.6 per cent of insoluble sulfur. After twenty-three days the insoluble sulfur content had decreased to 90.0 per cent. The rate of reversion to soluble sulfur is, therefore, about 2.1 per cent per month.

Both the highly concentrated product and the initial product containing 50 to 60 per cent insoluble sulfur produced by my process are useful. The initial product is useful, for example, in rubber compounding where the limit of sulfur loading is independent of the insoluble sulfur and depends only on the soluble sulfur present and, therefore, sulfur loading can be greatly increased without fear of blooming or recrystallization of the sulfur during storage or vulcanization.

I claim:

1. A process for producing insoluble sulfur which comprises quenching superheated sulfur vapor with a liquid carbon tetrachloride quenching medium to a temperature below about 60° C., freeing the condensed sulfur of quenching medium, aging the sulfur product for a period of time sufficient to effect stabilization and hardening, and reducing the sulfur product to particle form.

2. A process for producing a concentrated insoluble sulfur which comprises quenching superheated sulfur vapor with a liquid carbon tetrachloride quenching medium to a temperature below about 60° C., freeing the condensed sulfur of quenching medium, aging the sulfur product for a period of time sufficient to effect stabilization and hardening, reducing the sulfur product to particle form, treating the sulfur in particle form with a solvent for soluble sulfur at an elevated temperature but below a temperature at which substantial reversion of the insoluble sulfur occurs for a period of time sufficient to dissolve a substantial portion of the soluble sulfur therein, and freeing the remaining solid sulfur of solvent.

3. The process of claim 2 in which the treating step is conducted with toluene at about 90° C.

RALPH EUGENE MORNINGSTAR.

References Cited in the file of this patent

UNITED STATES PATENTS

| Number | Name | Date |
|---|---|---|
| 2,061,185 | Cecon | Nov. 17, 1936 |
| 2,419,324 | Missbach | Apr. 22, 1947 |
| 2,460,365 | Schallis | Feb. 1, 1949 |
| 2,513,524 | Schallis | July 4, 1950 |